(No Model.)

O. BENSON.
SNAP HOOK.

No. 286,253. Patented Oct. 9, 1883.

WITNESSES:
Rob't W. Matthews
Evard Ixfelt

INVENTOR
Oliver Benson,
BY A. W. Almqvist
ATTORNEY

UNITED STATES PATENT OFFICE.

OLIVER BENSON, OF BROOKLYN, NEW YORK.

SNAP-HOOK.

SPECIFICATION forming part of Letters Patent No. 286,253, dated October 9, 1883.

Application filed May 3, 1883. (No model.)

*To all whom it may concern:*

Be it known that I, OLIVER BENSON, a citizen of Sweden, and a resident of Brooklyn, in the county of Kings and State of New York, have invented a new and useful Improvement in Snap-Hooks, of which the following is a specification.

My invention relates to snap-hooks or any similar hooks, with or without spring to close the tongue, such as are used to connect chain-links to each other or to other parts—such, for instance, as fastening the reins to the bit of a horse's harness, &c.

The object of my invention is, mainly, to provide means for locking the tongue in the position when closed, so that the hook cannot be unduly detached.

Figure 1:
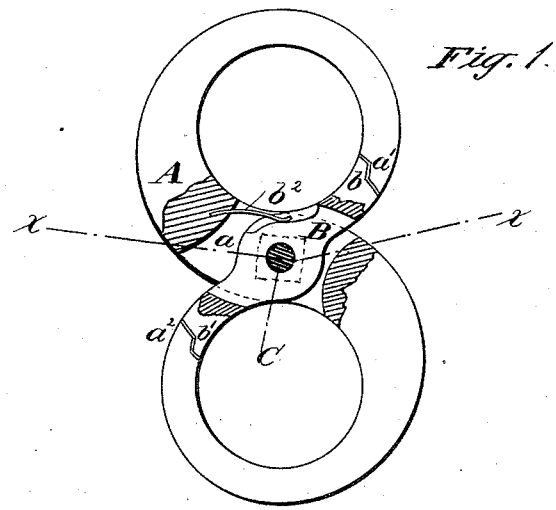
Figure 2:
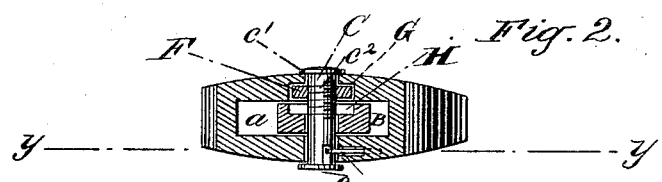
Figures 3, 4:
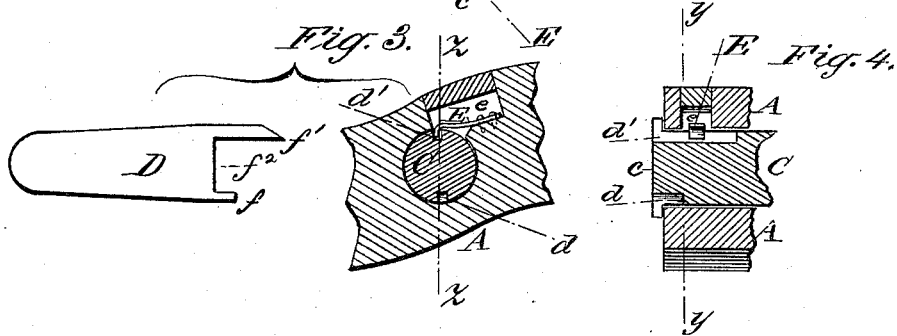
Figure 5:
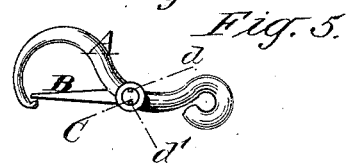

In the accompanying drawings, Figure 1 represents a side view of a double snap-hook constructed according to my present invention. Fig. 2 is a cross-section of the same, taken on the line $x\ x$ of Fig. 1. Fig. 3 is a side view of the unlocking-key and a section on the line $y\ y$ of Figs. 2 and 4. Fig. 4 is a cross-section taken on the line $z\ z$ of Fig. 3. Fig. 5 shows the most ordinary form of snap-hook, to which my invention is principally intended to be applied.

A is an S-shaped or double hook, having a slot, $a$, through its center portion, in which slot is pivoted a double tongue, B, closing, with its ends $b\ b'$ outward, against a suitable shoulder or recess upon both the ends $a'\ a^2$ of the hook A simultaneously.

A spring, $b^2$, may be connected to keep the tongue normally closed, as usual in snap-hooks.

C is the pivoting-pin. This may be made like an ordinary bolt, provided with a head, $c$, at one end, and riveted against a washer, $c'$, at the other end, so as to keep it in position, allowing it to turn but not to be moved endwise, as in Fig. 2; or, if it is desirable to make its ends flush with the opposite surface of the hook A, a groove may be turned in the circumference of the pin, and a small pin inserted in the said groove and in holes in the metal of the hook A; or any other means may be provided for retaining the pivoting-pin in its place while allowing to turn it, which may be done by an ordinary screw-driver and a slit in one end of the pin, as in the manner of ordinary wood-screws. Instead of one slit, I, however, prefer to form in one end of the pin C diagonally-opposite recesses $d\ d'$, the latter being deeper than the former, and in a suitably-covered recess, $e$, in the body of the hook A, I secure in any suitable manner a spring-catch, E, engaging in the said slot $d'$ when the pin C is turned in the position in which the tongue is locked, in order that both the pivot and the tongue be locked at the same time, as will presently appear.

To turn the pin C, I provide a separate key, D, or a screw-driver, having a short projection, $f$, suitable to enter the slot or recess $d$, and a longer projection, $f'$, which is beveled upon its outer surface to a point, as shown in the drawings, and suitable to enter the slot or recess $d'$, and in being pressed inward to enter with a sharp point between the spring-catch E and the inner side or bottom of the groove or slot $d'$, thus raising the spring-catch from contact with the pin C, consequently allowing to turn the said pin. For this purpose the key D should be made of such size that when entered into the slots $d\ d'$ its surface at $f^2$ should be flush with the outer circumference of the pivoting-pin C.

The tongue is locked by the following device: The pin C is threaded at $c^2$ for a short distance, and upon the threaded portion is fitted a square or angular nut, F, which, when the tongue B is unlocked, rests in a recess, G, in the body of the hook A, adjacent to the inner side surface of the slot or opening $a$. This recess G is just deep enough to inclose the nut to its full depth, and is of shape corresponding to that of the nut, so that this cannot turn in it. Contiguous to the said recess G there is formed in the tongue B an exactly similar recess, H, but which is shorter, being only about one-half the depth of the nut.

The locking of the tongue B is effected by simply turning the threaded pin C as if to screw it inward. This will cause the nut F to advance partly out of the recess G and into the recess H, lodging it to about one-half its depth in the said recess H.

It is evident that the entire strain of the locking is taken up by the nut F and the two recesses G H, and any attempt at turning the tongue B will not effect any strain upon the pin C. The slots in the pin C are so arranged that the catch E will engage one of them at the same time as the nut F has advanced to the desired depth into the recess H, thus locking the pin C and the hook B simultaneously, as before stated.

Having thus described my invention, I claim as new and desire to secure by Letters Patent—

1. The combination, with the hook A, having recess G, and the tongue B, having recess H, of the threaded turnable pin C and the nut F, substantially as and for the purpose set forth.

2. In combination with the hook A, tongue B, and pivot C, and with means for interlocking the said tongue and hook by turning said pivot, the spring-catch E, arranged to act as stop to the further turning of the pin when the tongue is locked, substantially as hereinbefore set forth.

3. The combination of the hook A and tongue B, having recesses G H, respectively, the nut F, the threaded pin C, provided with the opposite slots, $d\,d'$, of different length, the spring-catch E, engaging the longer slot, and key D, having the projections $f\,f'$, the latter being beveled and longer than the former, substantially as and for the purpose hereinbefore set forth.

In testimony that I claim the foregoing as my invention I have signed my name, in presence of two witnesses, this 1st day of May, 1883.

OLIVER BENSON.

Witnesses:
ROBT. W. MATTHEWS,
A. W. ALMQVIST.